United States Patent
Nekrestyanov et al.

(10) Patent No.: US 10,320,879 B2
(45) Date of Patent: Jun. 11, 2019

(54) SOFTWARE SERVICE DISCOVERY AND SERVICE EVOLUTION MANAGEMENT

(71) Applicant: Verizon Patent and Licensing Inc., Arlington, VA (US)

(72) Inventors: Igor Nekrestyanov, Santa Clara, CA (US); Doug H. Kang, Santa Clara, CA (US); Samarpit Bhatia, Santa Clara, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 942 days.

(21) Appl. No.: 14/795,053

(22) Filed: Jul. 9, 2015

(65) Prior Publication Data
US 2017/0012815 A1   Jan. 12, 2017

(51) Int. Cl.
*H04L 12/24* (2006.01)
*H04L 29/08* (2006.01)

(52) U.S. Cl.
CPC .......... *H04L 67/02* (2013.01); *H04L 41/5058* (2013.01); *H04L 41/5048* (2013.01)

(58) Field of Classification Search
CPC .. H04L 67/02; H04L 41/5048; H04L 41/5058
See application file for complete search history.

(56) References Cited

U.S. PATENT DOCUMENTS

| | | | |
|---|---|---|---|
| 2009/0024561 A1* | 1/2009 | Palanisamy | G06F 17/30174 |
| 2010/0088367 A1* | 4/2010 | Brown | G06F 8/60 709/203 |
| 2011/0145408 A1* | 6/2011 | Olsson | H04L 41/5058 709/225 |
| 2013/0024851 A1* | 1/2013 | Firman | G06F 8/60 717/170 |
| 2014/0013315 A1* | 1/2014 | Genevski | G06F 8/60 717/170 |
| 2015/0143355 A1* | 5/2015 | Tingstrom | G06F 8/65 717/170 |
| 2016/0092535 A1* | 3/2016 | Kuchibhotla | G06F 17/30575 707/634 |

* cited by examiner

*Primary Examiner* — Shean Tokuta
*Assistant Examiner* — Juan C Turriate Gastulo

(57) ABSTRACT

Attributes of revisions of a service are identified and maintained. The attributes include immutable data identifying the revisions, times associated with generation of the revisions, connection data associated with accessing the revisions, and other services used by the revisions. The attributes also include mutable data indicating whether the revisions are compatible with various versions of the other services. A discovery request is received from a requesting device, and discovery request identifies versions of the other services used by the requesting device. A revision of the service that is compatible with the used versions of the other services are identified based on the attributes. The identified revision and connection data are identified to the requesting device. The attributes are updated, and a different revision may be identified to the requesting device based on the updates.

20 Claims, 10 Drawing Sheets

| LOGICAL SERVICE NAME TABLE (300) | REVISION IDENTIFIER COLUMN (310) | REVISION TIME COLUMN (320) | CONNECTION DATA COLUMN (330) |
|---|---|---|---|
| | REVISION 1 | TIME 1 | URI-1 |
| | REVISION 2 | TIME 2 | URI-2 |
| | REVISION 3 | TIME 3 | URI-3 |
| | ⋮ | ⋮ | ⋮ |
| | REVISION N-1 | TIME (N-1) | URI-(N-1) |
| | REVISION N | TIME N | URI-N |

| LOGICAL SERVICE NAME TABLE (304) | REVISION IDENTIFIER COLUMN (310) | VALIDATION INDICATOR COLUMN (340) | APPROVAL INDICATOR COLUMN (350) | CHANGE LOG ENTRY COLUMN (360) |
|---|---|---|---|---|
| | REVISION 1 | VALIDATED | NOT APPROVED | FAILED A/B TEST |
| | REVISION 2 | INVALIDATED | APPROVED | FAILED INTEGRATION TEST |
| | REVISION 3 | VALIDATED | APPROVED | PASSED A/B TESTING AND INTEGRATION TEST |
| | ⋮ | ⋮ | ⋮ | ⋮ |
| | REVISION N-1 | VALIDATED | APPROVED | PASSED A/B TESTING AND INTEGRATION TEST |
| | REVISION N | UNVALIDATED | NOT APPROVED | STILL PERFORMING A/B AND INTEGRATION TESTING |

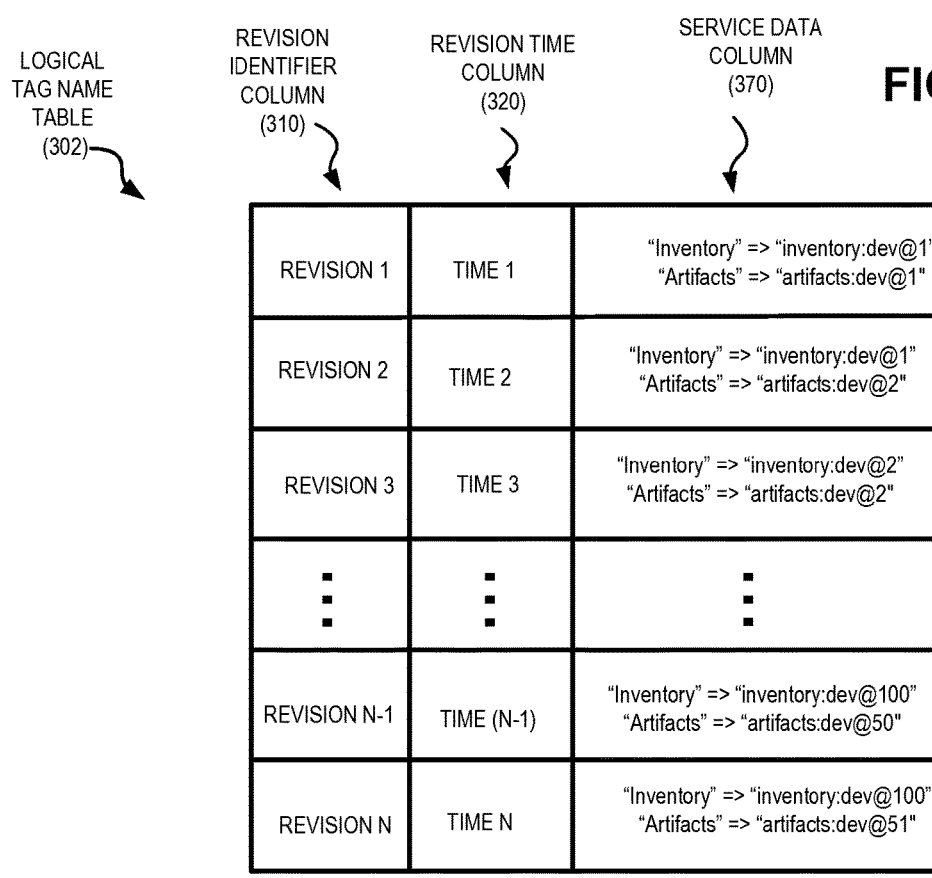

| REVISION IDENTIFIER COLUMN (310) | ENABLED INDICATOR COLUMN (380) | VALIDATION INDICATOR COLUMN (340) | APPROVAL INDICATOR COLUMN (350) | CHANGE LOG ENTRY COLUMN (360) |
|---|---|---|---|---|
| REVISION 1 | NOT ENABLED | VALIDATED | NOT APPROVED | NOT APPROVED BY PRODUCT MANAGEMENT |
| REVISION 2 | NOT ENABLED | INVALIDATED | APPROVED | NOT APPROVED BY EARLY ACCESS USERS |
| REVISION 3 | ENABLED | VALIDATED | APPROVED | APPROVED BY PRODUCT MANAGEMENT AND EARLY ACCESS USERS |
| ... | ... | ... | ... | ... |
| REVISION N-1 | ENABLED | VALIDATED | APPROVED | APPROVED BY PRODUCT MANAGEMENT AND EARLY ACCESS USERS |
| REVISION N | NOT ENABLED | UNVALIDATED | NOT APPROVED | WAITING FOR APPROVAL |

LOGICAL TAG NAME TABLE (303)

FIG. 3D

SOFTWARE SERVICE DISCOVERY AND SERVICE EVOLUTION MANAGEMENT

BACKGROUND INFORMATION

A device may use various types of software services, such as a web service to exchange data with another device and a communications service to communicate with another device. For example, a web service device may enable a requesting device (e.g., a client or host device) to access certain data or to achieve another function. For example, an online retailer may use web services related to presenting a catalog, receiving a selection from the catalog, and processing a payment for the selection.

To access a software service, the requesting device transmits a request to a software service device. The request for a software service may include contact information that may be used by a client device to locate and access the software service. For example, the request may include a uniform resource identifier (URI) that identifies a host name for the software service device, a port number for communications related to the software service, a location of a related software service application in a directory structure of the software service device, etc. Based on receiving the request, the software service server may execute programming code for the software service, generate a software service response, and transmit the generated response back to the requesting device.

The programming code of a web service may be updated, for example, to provide new functionalities, to improve the efficiency of the web service or an associated web service application protocol interface (API), to correct an error, etc. In another example, a web service may be deployed to a different network location to improve access by client device, to provide redundant copies of the service, etc. When a software service or a software service API programming code is updated, the updated revision of the software service may be accessed using contact information for the target service (e.g., the URI).

Various issues may arise when migrating between revisions of a software service, such as to provide a new revision of a software service or to direct clients to an older revision of the software service (e.g., rolling-back to the older revision when a problem is found in a newer revision of the software service). For example, a target device should ensure consistency in sets of related services (e.g. if new revisions of a service A and a service B share an application programming interface (API) or have another form of mutual dependency), updates to services A and B should be rolled out together as combination. For example, if a new revision of one service (e.g., service A) and older revision of another service (e.g., service B) may not be function together correctly.

Furthermore, migrating between revisions of a service may include managing dependencies of services. For example, if service A calls on other services B and C, and service B also calls service C to process a request associated with service A, then a same revision of service C should be used to handle requests received from both services A and B. Otherwise, errors may arise. For example, if service C relates to acquiring data from a database, different revisions of the service C may acquire data from different versions of the database.

BRIEF DESCRIPTION OF THE DRAWINGS

FIGS. 3A-3D show exemplary tables that may correspond to portions of metadata maintained in the environment shown in FIGS. 1A and 1B;

DETAILED DESCRIPTION OF PREFERRED EMBODIMENTS

Figure 1A:
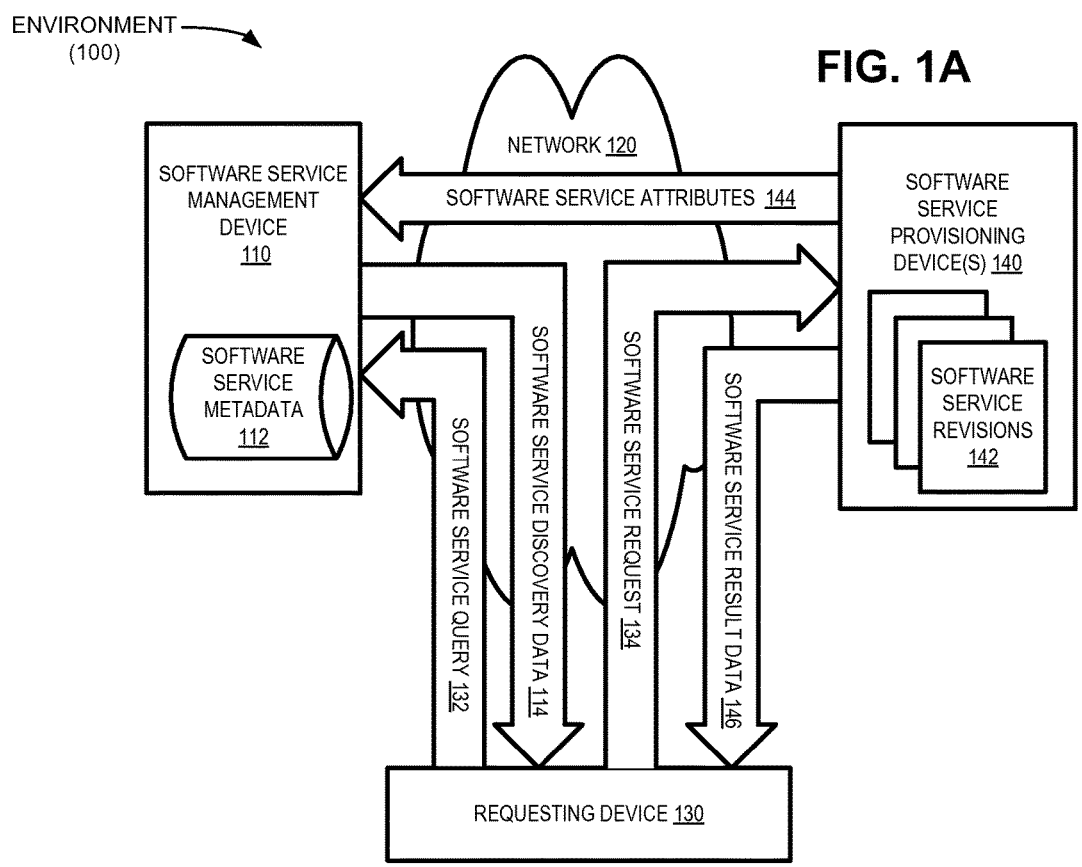
FIGS. 1A and 1B are diagrams showing an exemplary environment in which the systems and/or methods described herein may be implemented.

The following detailed description refers to the accompanying drawings. The same reference numbers in different drawings identify the same or similar elements.

In certain implementations, a one or more software service provisioning device may provide different revisions of a software service (such as a web service). For example, different software service provisioning devices may provide several different revisions at the same time but with have different lifetimes (e.g., so the different software service provisioning devices start and stop independently). A software service management device may collect metadata regarding the different revisions of the web service. A requesting device, such as a client device, may forward a service query, and the service query may include a logical identifier for a desired service. The software service management device may use metadata regarding the software service and data included in the query (e.g., data regarding a ROLE and CONTEXT for the service) to identify usable/validated revisions of the service. The software service management may forward discovery data identifying selected revisions of the software service, and the discovery data may include a storage address or other contact information associated with the selected revisions. The requesting device may use the contact information to access any of the selected revisions of the service. For example, the requesting device may form a request that includes the contact information and may direct the modified request to the software service provisioning device to access the service. The modified request may cause the software service provisioning device to provision the selected revision of the web service to the requesting device.

In certain implementation, the systems and method described herein may provide certain metadata regarding service and service collection definitions that is immutable (does not change over time) whereas other data is mutable (can be modified) as needed. For example, concrete identifiers may used to refer to the same configurations but status information regarding the configurations can be modified so that so that the different configurations can be selected at different times (e.g., a newest enabled configuration) but rollback can occur to select an older, previous stable state if a problem is identified in a newer configuration (e.g., a version of a service used by the newer configuration ceases to be enabled).

In certain implementation, the systems and method described herein may provide a discovery process is a service collection centric. For example, a client device may receive discovery data identifying a collection of services to use and may then use a service from the selected collection.

Thus, when the client uses multiple services, compatible versions of services may be identified to the client.

In certain implementation, the systems and method described herein may provide a discovery process in which logical identifiers used by clients to refer to "best" available service/service collection that matches client selection criteria (as defined by service tag name and service tag attributes).

The terms "service" and "software service" are used interchangeably herein to refer broadly and inclusively to any unit of software functionality that is exposed to or interacts with at least one other service, application, or system on a local area network, wide area network, or even a single process. For example, such functionality of the web service may be provided to one or more clients via an interface described in a machine-readable format, for example, the Web Services Description Language (WSDL). In another example, a service may use messages in an extensible markup language (XML) format, and one example of a network communication protocol that uses messages in XML format is the Simple Object Access Protocol (SOAP). A web service generally passes messages (e.g., requests and responses) to and from clients as a form of communication through the communication network. Furthermore, the communication network can include the Internet or World Wide Web, and the service can be a web service hosted at a server configured to exchange communication with clients over the Internet. As previously described, a web service may relate to accessing data stored by a remote device using hypertext transfer protocol (HTTP) or other web protocol. Other types of software service may operate with HTTP or other web-based protocol. For example, a non-web-service may relate to a discovery database and communications that occur using a proprietary binary (e.g., non-HTTP) protocol.

The term "client" is used herein to refer broadly to any process configured to consume a functionality of a service offered by a server. For example, when a client uses a service, the client is generally utilizing at least one function of the service. Such a client may be executed at any type of computing device (e.g., a client device) including, for example and without limitation, a desktop computer or workstation, a mobile device, or a host or network device that may operate at other times as a server to other clients. A "server" process may be executed by any type of computing device capable of communicating data to one or more clients over a communication network. Further, a client can be any type of remote or local process with respect to the computing device executing or hosting the service. In one example, a server process may run on the same device as a client consuming the functionality of the server. Also, a client can be another service. An application programming interface (API) can refer to a process providing an interface for (or access to) one or more web services. The API can be executable code used for accessing a single web service, and/or for accessing two or more web services through routines providing additional functionality over the functionality of the individual web services.

Figure 1B:
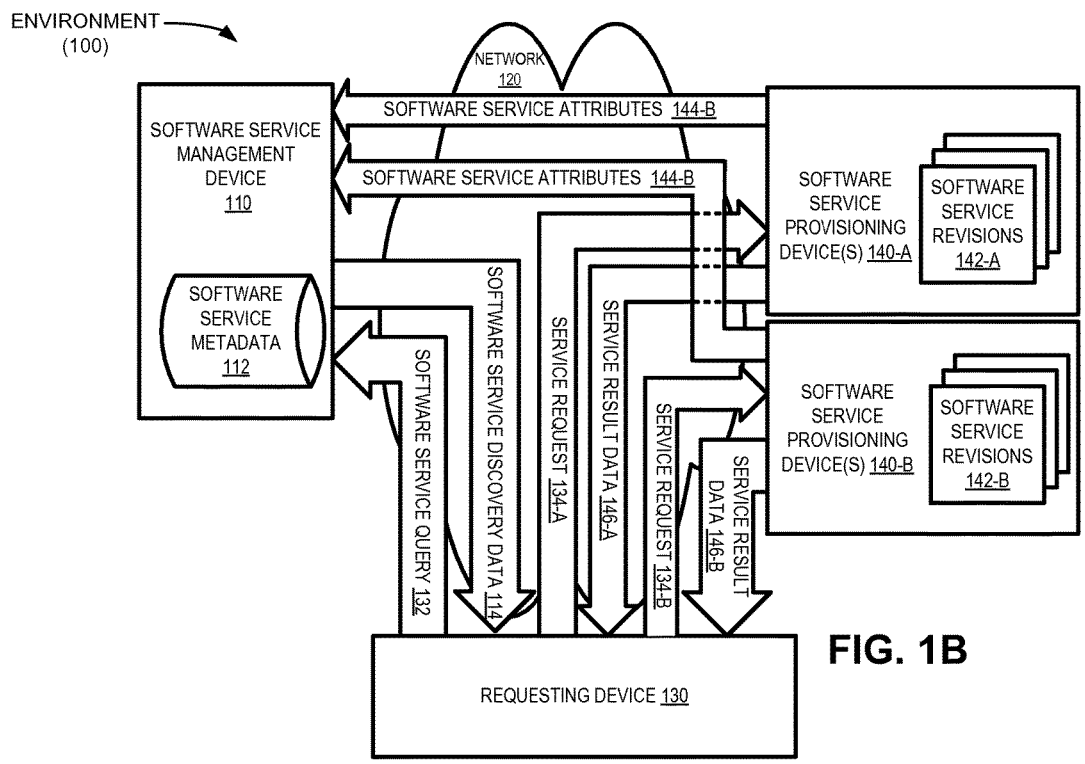

FIGS. 1A and 1B are diagrams showing an exemplary environment 100 in which the systems and methods described herein may be implemented. As shown in FIG. 1A, environment 100 may include a software service management device 110, a network 120, a requesting device 130, and one or more software service provisioning devices 140.

In environment 100, when a service is initially deployed, software service provisioning device 140 may provide information (e.g., software service attributes 144) associated with the service, such as connection data (e.g., a URI, socket data, etc.) associated with the revision of a service, other services used (e.g., called by) the service, etc. to software service management device 110. When a revision is made to the service (e.g., a new deployment of the service is released), software service provisioning device 140 may provide information (e.g., software service attributes 144) identifying attributes of the revision (e.g., new connection data), and software service management device 110 may direct a requesting device to use the new revision instead of an older revision of the service. When a service (or revision of the service) is deployed, an older revision of the service may be un-deployed (e.g., no longer be available to be accessed by requesting device 130). For example, software service provisioning device 140 may forward data (e.g., software service attributes 144) identifying an older, un-deployed revision of the service so that software service management device 110 can update software service metadata 112 and no longer identifies the un-deployed revision of the service to requesting device 130.

As used herein, a "revision" of a service may relate to source code revisions, build revisions, service deployments that are registered in discovery, etc. Software service provisioning device 140 may implement a new deployment of a service, such as a new revision (also known as a new build) of the service, or software service provisioning device 140 may redeploy a previously used build of a service. In both cases, the software service provisioning device 140 may be offering a new deployment of a service, and may register the new deployment may be registered in discovery as a new deployment revision. For example, an "accounts:prod@15" notation corresponds to a fifteenth deployment of an "account:prod" service. To differentiate between these different situations, the term "revision" may generally refer to a new deployment of services (regardless of whether the new deployment relates a same or a different artifact version).

Software service management device 110 may maintain software service metadata 112 that includes information regarding revisions of a web service. For example, software service management device 110 may store, as software service metadata 112, information identifying, for each revision of web service: (1) contact information, such as a URI; (2) details on the build artifact; (3) deployment details, such as data identifying a datacenter and rack associated with the deployment and other information that can be used to manage a deployment, e.g. take it down once this revision is not needed); and/or (4) metadata describing runtime properties of a deployment (e.g. whether the deployment passed validation tests or was approved for deployment, etc) and that can be used to control a lifecycle of the service. Software service metadata 112 may be organized in the sequence or revisions based on deployment sequence (e.g., based on the data of the revisions) and is generally not a dictionary of the available revisions. Software service management device 110 may generate software service metadata 112 based on web service attributes 144 received from software service provisioning device 140.

Typically, data regarding revisions (e.g., software service versions 142 stored by software service provisioning device 140) is immutable and does not change once a revision of the service is deployed. Any changes to a deployment of a service would be considered a new revision. Conversely, software service metadata 112 may be generally mutable and may be changed to reflect deployment or un-deployment of one or more service revisions. In this way, software service metadata 112 may be used to define, for example, precisely what is "next desired state" or "previous stable state" of a service so that software service management device 110 may identify available revisions of the service that may be used by requesting device 130. In this way, software service management device 110 may maintain a directory of revisions of different available services in different contexts. Additional aspects of software service metadata 112 are described below with respect to FIGS. 3A-3D.

Software service management device 110 may receive, from requesting device 130, a software service query 132 requesting data related to revisions of a software service. For example, software service query 132 may include a logical name or other identifier for the requested service. Software service query 132 may query service management device for a specific (but dynamic) entry in the directory of services revisions maintained in software service metadata 112. Software service query 132 may include input constraints identifying a role and context for a service (also known as a ServiceType and a service tag). The role may identify a function to be performed by a service, and a context may identify a situation in which the function is being performed (e.g., whether the service is being called by a client device or being used in connection with another service).

Software service management device 110 may use data from software service query 132 (e.g., the ServiceType and service tag) to perform a lookup operation of software service metadata 110. This lookup operation is functionally similar to domain name system (DNS) resolution that is used to direct a client device to a service in conventional systems, but using different method to perform a lookup and using different inputs for the lookup operation. For example, software service management device 110 may use data in software service query 132 to select on the revisions of a service. For example, software service management device 110 may select a newest revision of a service, or software service management device 110 may select an older revision of the service that is known to be compatible with a role and context for a service as indicated in software service query 132. For example, requesting device 130 may request a service that is being used in connection with another software service, and software service management device 110 may select an older revision of the service that is known to be compatible with a selected revision of the other software service.

Based on receiving software query 132, software service management device 110 may provide software service discovery data 114 to requesting device 130. Software service management device 110 may forward, in software service discovery data 114, information identifying usable revisions of a service that conform with the role and the context criteria identified in software service query 132. Software service discovery data 114 further include connection data that may be used by requesting device 130 to access the identified revisions of the service. For example, the connection data may include URIs, network socket details for accessing a service revision, etc. that may be used by requesting device 130 to access the different revisions via software service provisioning devices 140. For example, a URI included in web services discovery data 114 may be associated with a network address for software service provisioning device 140 and a port in software service provisioning device 140 allocated to the revision of the web service. Requesting device 130 may obtain software service discovery data 114 from software service management device 110 synchronously (e.g., in connection with requesting a service) or asynchronously (e.g., prior to requesting the service) and may store this connection data for use at a later time to access the identified revisions of the service.

For a lookup operation through software service management device 110, requesting device 130 or a service calling on another service may look up service deployments based on a given ROLE (e.g., set of APIs defined as "ServiceType") in the given CONTEXT (defined as a specific service tag revision). As used herein, a ROLE may part of the code for the service and CONTEXT is a runtime property that may be either inherited from the incoming call (if the code being executed to serve incoming call) or it is defined globally per requesting device or when the service is called from another service (e.g. when the other service is started). CONTEXT may be used by software service management device 110 to restrict the scope of discovery to include only relevant services. For example, a service tag may define what is useful in a context of a service, so not every new deployment impacts the service and need to be considered by software service management device 110.

Furthermore, software service management device 110 may use CONTEXT data to provide isolation. For example, if there are multiple deployments of a service with different logical names, then software service management device 110 may separately consider the deployments associated with different logical names, because requesting device 130 may operate in the context of some service tag and thus, may only be able to use one of these service deployments (the one linked from the service tag). In this way, multiple instances of a same service may be deployed using same or different versions of build artifacts with different logical names. For example, certain deployments of a service may be associated with a first logical name for use by one group of customers (e.g., a test group), while other deployments of the service may be associated with a second, different logical name for use by a second group of customers (e.g., a non-test group may receive deployments that have been verified by the test group).

In one implementation, software service management device 110 may include, in web services discovery data 114, ServiceType data that includes a full definition of the service tag. This enables requesting device 130 to use "compatible" revisions of the services if it needs to make multiple calls for a service. Consider, for example, a situation in which a service A calls to services B and C, and in turn, service B also calls to service C. When requesting data regarding available revision of service A and B, requesting device 130 may generate service request query 132 that includes a service tag entitled "sampletag" to request data regarding service C. Software management device 110 may resolve "sampletag" to identify a common revision (e.g. revision 3 of service C) that would be used by requesting device 130 when accessing service C in connection with accessing services A and B. In this way, software management device 110 may ensure that revisions of services B and C originate from a same tag revision.

In certain implementations, software service management device 110 may support groups of dependent services and prevent incompatible services or revisions of services from being used by requesting device 130 at the same time. Furthermore, software service management device 110 may limit change scope by restricting "context" to include selected set of service roles and service families, such as by managing scopes of revisions without impact on each other. Furthermore, software service management device 110 may capture evolution of service deployments including (1) defining what the state of prior revisions; (2) deploying new revisions of service and make the new revisions visible as part of the "context" but to restricted set of clients, such as to test a new revision; (3) smoothly transition between two new revision (or rollback to older revision) based on metadata change in software service metadata 112 so that software service management device 110 selects different revisions; selectively control access to the revisions, generate a well-defined audit trail related to a revision; (4) identifying difference in set of services being used between arbitrary moments of time (e.g. what changed in the system since yesterday); and (5) selectively reverting to a prior revision (e.g., a last-known working revision) of a service if problems are identified in a new revision of the service).

Network 120 may include a communications network, a data network, or a combination of networks that connect web services management device 110 and software service provisioning device 140. For example, network 120 may include a local area network (LAN), a wide area network (WAN), a metropolitan area network (MAN), a wireless network, an optical fiber (or fiber optic) network, an internet, the Internet, or a combination of these or other networks. In addition or alternatively, network 120 may include or be included in a radio network capable of supporting wireless communications to/from one or more devices in environment 100, and the radio network may include, for example, a long-term evolution (LTE) network, another 3rd Generation Partnership Project (3GPP) 3G/4G network, Global System for Mobile Communications (GSM), wideband code division multiple access (WCDMA), Ultra Mobile Broadband (UMB), Universal Mobile Telecommunications System (UMTS), Code Division Multiple Access 1000 (CDMA2000), High-Speed Packet Access (HSPA), Worldwide Interoperability for Microwave Access (WiMax), enhanced high-rate packet data (eHRPD), or a network implemented in accordance with other wireless network standards, including future wireless network standards.

Requesting device 130 may correspond to client device (e.g., a computer, laptop, smart phone, table computer, set-top box, etc.) and/or a software service requesting another software service. Requesting device 130 may communicate with software service management device 110 through network 120 to forward web services attributes 144. Requesting device 130 may access a software service provided by software service provisioning device 140. For example, requesting device 130 may discover usable deployments of a service and/or a service application programming interface (API) by sending software service query 132 to software service management device 110. Software service query 132 include data that identifies a ROLE and a CONTEXT associated with the requested use of a service by requesting device 130, and software service management device 110 may use the ROLE and the CONTEXT data to selected one or more of the revisions of a service for requesting device 130. For example, software service management device 110 may capture metadata regarding the evolution of service deployments and simplify management of changes in a service by identifying attributes of different revisions and identifying revisions for requesting device 130 based on ROLE and CONTEXT data forwarded by requesting device 130. Requesting device 130 may receive, from software service manage device 110, software service discovery data 114 identifying available service revisions 142 that match the ROLE and the CONTEXT data identified in software service query 132. As previously described, software service discovery data 114 may include connection data for the identified software service revisions 142, and requesting device 130 may selectively access one or more of the identified revisions using this connection data.

Software service provisioning device 140 may include a server or computer system to perform various functions related to providing a web service via network 120. For example, software service provisioning device 140 may receive service request 134 associated with a selected revision of a web service 142. Software service provisioning device 140 may execute code or otherwise provision the selected revision 142, and software service provisioning device 140 may forward web service result data 146 to requesting device 130.

Although FIG. 1A shows software service provisioning device 140 as a single unit that includes multiple web service revisions 142, it should be appreciated that software service provisioning device 140 may include multiple devices. For example, software service provisioning device 140 may correspond to a cloud-based storage system that includes multiple devices to store web service revisions 142 and to provide access to the multiple web service revisions 142. For example, software service provisioning device 140 may include one or more servers or computing devices that may act as a "go-between" requesting device 130 and devices storing web service revisions 142. In some implementations, requesting device 130 may access web service revisions 142 directly, and in other implementations, requesting device 130 may access web service revisions 142 via an intermediate device, such as a server, that manages access to the web service revisions 142.

Software service provisioning device 140 may include a data structure or database (not shown) that stores information related to cloud storage containers for storing web service revisions 142, such as a name and location associated with each web service revision. The data structure may additionally store an enable flag associated with a cloud storage container. The enable flag may be set to "false" if, for example, a service is not in use or service is considered to be broken. If the enable flag is set to false, a service deployment can be deleted as an external garbage collection jobs. In one implementation, a discovery service associated with software service management device 110 may record who, when and why the enable flag was set to "false". This type of metadata may be useful for audit trails, but does not indicate when (if ever) the service is actually removed. Furthermore, in this example, a service may be disabled via a logical operation (e.g., setting the enable flag to "false) and the service can be re-enabled (if desired) by modifying the value of the enable flag to "true."

FIG. 1B shows an example, of environment 100 in which software service query 132 from requesting device 130 requests data regarding two separate services (i.e., service A and service B). In the example shown in FIG. 1B, requesting device 130 may request discovery data 114 from software service management device 110 identifying revisions 142-A of service A and revisions 142-B of service B. For example, requesting device 130 may seek to access services A and B, and service B may further be called by service A. In this example, software service management device 110 may identify the same revision of service B to be accessed directly by requesting device 130 (e.g., via service request 134-B) and indirectly by service A as a result of service A being accessed by requesting device 130 (e.g., via service request 134-A). Software service management device 110 may collect software service attributes 144-A and 144-B identifying attributes of deployments of service A and deployments of service B to generate software service metadata 112. The software services management device 110 may collect certain attributes from the running services or the provided services, and may further collect attributes from the external sources such as quality team, product management, etc. Some of these attributes may be used to represent offline decisions (e.g. product management approves new version to go into production).

Software service query 132 may include ROLE and CONTEXT data forwarded by requesting device 130 with respect to services A and B (e.g., to indicate that requesting device 130 needs to access services A and B and also that service B is being called by service B). Based on the contents of software service query 132 and software service metadata 112, software service management device 110 may identify deployments of services A and B that satisfy the ROLE and CONTEXT data identified in software service query 132. Software service discovery data 114 may include connection data (e.g., URIs) for the selected deployments of services A and B, and requesting device 130 may access the identified deployments of services A and B using the connection data. For example, requesting device 130 may forward service requests 134-A and 134-B to software service provisioning devices 140-A and 140-B to access services A and B, and requesting device 130 may receive service results data 146-A and 146-B forwarding results from the selected deployments of services A and B.

Although FIGS. 1A and 1B show exemplary components of environment 100, in other implementations, environment 100 may include fewer components, different components, differently arranged components, or additional components than those depicted in FIGS. 1A and 1B. For example, although environment 100 is shown in FIGS. 1A and 1B as including separate software service management device 110 and software service provisioning device 140, functions described as being performed by software service management device 110 and software service provisioning device 140 may be performed by a single device. Additionally or alternatively, one or more components of environment 100 may perform functions described as being performed by one or more other components of environment 100.

Figure 2:
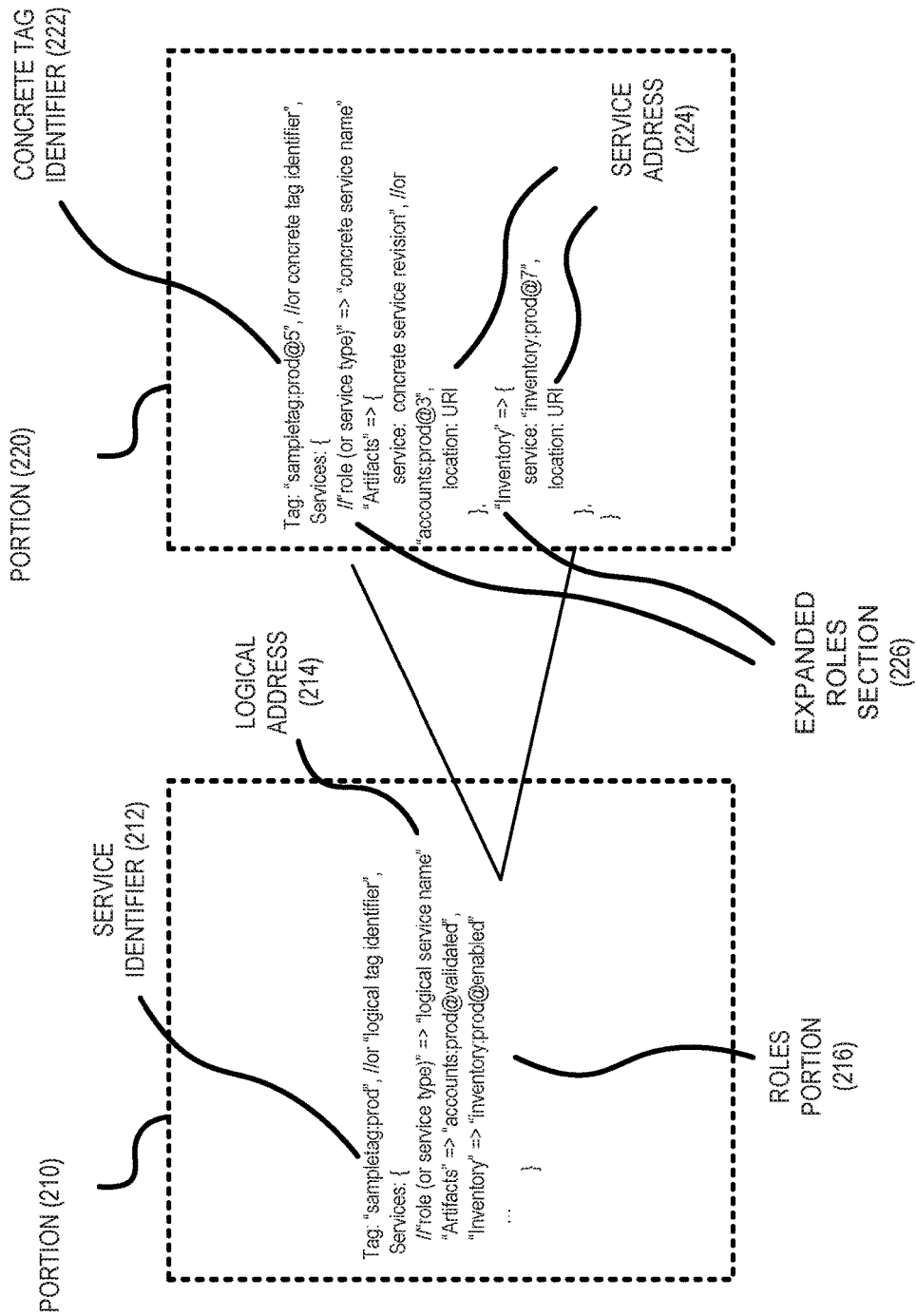
FIG. 2 shows an exemplary conversion of an tag section to identify service revisions in the environment shown in FIGS. 1A and 1B.

FIG. 2 shows (1) an exemplary portion 210 of software service query 132 that may be received by software service management device 110 and (2) an exemplary portion 220 of software service discovery data 114 that may be generated by software service management device 110 based on a look up operation the is performed using data in portion 210 of software service query 132. For example, as shown in FIG. 2, portion 210 of software service query 132 may include, a service identifier 212 that includes a logical tag ("sampletag:prod") and a logical address 214 ("logical service name"). Portion 210 may further include a rules portion 216 that identifies an "Artifacts" role associated with a validated revision of the accounts service, and an "Inventory" role associated with an enabled version of an inventory service.

One difference between portion 210 of a software service query 132 and exemplary portion 220 of software service discovery data 114 is in identifiers. For example, in portion 210 of a software service query 132, the identifiers refer to "logical revisions", such as "accounts:dev@enabled" (e.g., requesting a latest enabled version of an "accounts" service), whereas exemplary portion 220 of software service discovery data 114 may include specific revision identifiers like "accounts:dev@3" (e.g., revision 3 of the "accounts:dev" service). To generate portion 220 of software service discovery data 114, software service management device 110 may perform tag expansion to map logical revisions to identify specific service revisions 142 to requesting device 130.

For example, as further shown in FIG. 2, portion 220 of software services discovery data 114 may include a concrete tag identifier 222. Software service management device 110 may perform a lookup operation to map ROLE and CONTEXT data in portion 210 of software services query 132 to generate an expanded tag revision and returns the expanded tag revision to requesting device 130 as portion 210 of software services discovery data 114. In this way, a "services" part of expanded roles portion 226 may function as a dictionary of the identified roles (i.e., "Artifacts" and "Inventory" services in FIG. 2). For example, software service management device 110 may determine, as a service address 224, physical addresses (e.g., "URI") associated with the selected revisions of the identified roles (e.g., revision 3 of the "accounts" service and revision 7 of the "inventory" service).

Although FIG. 2 shows exemplary components of portions 210 and 220, in other implementations, portions 210 and 220 may include fewer components, different components, differently arranged components, or additional components than those depicted in FIG. 2.

As described herein, software services metadata 112 may include data related to both services and service tags, which are generated to reflect sequences of revisions. Revisions may be referenced by logical or concrete revision identifiers. Data related to both service and service tag revision may both have "immutable" and "mutable" portions. The "mutable" part of the data may be limited to lifecycle related attributes and change log. The Immutability of data may help to ensure that revision identifiers effectively refer to the same deployment/configuration at any moment of time.

As used herein, data related to a service may be a representation of a web service with one fixed ROLE. Service revisions are different alternative deployments providing functionality required for the ROLE. For example, multiple versions of an "Accounts" service may provide similar functionality but with different sets of bug fixes. These revisions can be marked with attributes such as enabled, validated, approved or other events replicating lifecycle states. For example, service may be marked "enabled" to be discoverable. A "Validated" attribute may be used to mark services that have passed an automated validation procedure. These or other attributes may be used in the logical revision identifiers to refer to latest revision having attribute in question. Any requesting device 130 may typically only use one of these deployments at a time (e.g., based on what logical revision of service is identified by software service management device 110 for requesting device 130 in a given Role and Context, such as other services being used by requesting device 130).

Service tag represents collection of services (or dictionary of services). At any given moment of time this "state" of such collection is always some set of real service deployments but a service tag may evolve over time as new services are deployed. Software service management device 110 uses service tags data to ensure requesting device 130 uses compatible versions of the service in case the service is used with other services with different roles. For example, in architectures based on micro-services, there may be hundreds (or thousands) of services with different roles and many dependencies between these numerous services to be reconciled.

A service tag is stored as a set of revisions of such collection of services where each revision is state of collection at some moment of time. Immutable part of the data associated with service tag revision contains concrete collection of services. Any change in this collection will result in new revision to be created. Mutable part of the service tag revision includes lifecycle related attributes such as enabled/ disabled or validated or approved. Attribute semantics for a service tag revision is similar to the semantics for service revision (e.g. if a tag revision is disabled then that tag revision is unusable) except these attributes are applicable to the system as a whole, not a specific service. Consequently, inputs for service tags may be provided from different sources. For example, a "validated" indication for a service may mean the service passed automated integration or smoke tests and "validated" for the tag could mean that this system configuration passed "beta test".

FIGS. 3A-3D show exemplary logical service name tables 300 and 301 that correspond to portions of web service metadata 112 related to services and exemplary logical tag name tables 302 and 303 that correspond to other portions of web service metadata 112 related to services tags. The data in tables 300-301 may be used by software service management device 110 to resolve a logical alias, such as "accounts: prod@validated", that is received in query 132 from requesting device 130. In this example, software service management device 110 may select a most recent ENABLED revision of the "accounts:prod" service with validated attribute set to true. For example, a provided CONTEXT may be defined with logical tag revision alias (i.e., "metadata:prod@approved"), and software service management device 110 may resolve the logical tag revision (in this case, identify the latest ENABLED tag revision with APPROVED attribute on). Software service management device 110 may convert a logical tag revision into concrete tag revision. For example, the concrete service revisions in the selected tag revision may be mapped to URIs so that roles are mapped to the URIs. Then, a service may be selected by service management device 110 based on the ROLE.

As shown in FIG. 3A, table 300 may include service metadata identifying attributes of different service revisions. In table 300, entries in each row are associated with a same revision of a web service, and each column presents different types of metadata associated with revisions of the web service. Service revisions metadata identified in table 300 are generally immutable (e.g., cannot be changed). As shown in FIG. 3A, table 300 may include a revision identifier column 310, a revision time identifier column 320, and a connection data column 330. When web service revisions 142 are stored to software service provisioning device 140, software service provisioning device 140 may forward web service attributes 144 associated with web service revisions 142. Software service management device 110 may determine software service metadata 112 included in table 300 based on web service attributes 144.

Revision identifier column 310 may include data identifying a revision of a web service. Typically, table 300 may be organized such that different revisions of a same revision are positioned in adjacent rows, with metadata associated with newer revisions being positioned below data associated with older revisions (or vice versa). In the specific example shown in FIG. 3A, table 300 includes data associated with Revisions 1 through Revision N. Revisions are generally ordered, and values in revision identifier column 310 may identify the ordering of the revisions. When new revision is added, a new row is added to table 300 and a next row number may be assign to the next revision.

Revision time identifier column 320 may identify a time when an associated revision is generated or created by a developer and/or received by software service provisioning device 140 (shown in FIG. 3A as "Time 1" through "Time N"). In the example shown in FIG. 3A, table 300 may be organized such that metadata associated with newer revisions (e.g., associated with later times in revision time identifier column 320) are positioned in lower rows than metadata associated with older revisions.

Connection data column 330 may store respective contact information associated with the revisions identified in revision identifier column 310. For example, connection data column 330 may identify a URI associated with a network address of software service provisioning device 140 and a port of software service provisioning device 140 associated with the specific revision of the service, or connection data column 330 may include other connection data. In the example, shown in FIG. 3A, revisions 1 through N of the web services are associated with, respectively, URIs 1 through N. Thus, the different revisions of the web service may be separately stored and accessed via software service provisioning device 140. Furthermore, software service provisioning device 140 may continue to store one or more older revisions of the web service even after a new revision of the web service is received. In this way, an older revision of a web service can be selectively accessed as needed, such as to enable requesting device 130 to access the older revision when appropriate, such as when an newer revision is not available, not valid, and/or not compatible with a ROLE/CONTEXT identified by requesting device 130.

Although FIG. 3A shows table 300 as including certain types of metadata associated with service revisions 142 that may be stored by software service management device 110, it should be appreciated that table 300 may include different, additional, fewer, and/or differently order data than shown in FIG. 3A. For example, table 300 may further include information regarding attributes of service revisions 142 such as details on the build artifact used for deployment or deployment details such as datacenter and rack info, etc.

FIG. 3B shows a table 301 that may store entries related to changeable metadata associated with different service revisions. In table 301, entries in each row are associated with a same revision of a web service, and each column presents different types of metadata associated with revisions of the web service. Service metadata identified in table 301 is generally mutable (e.g., can be changed over time) to reflect changes in the statuses of the service revisions identified in revision identifier column 310. As shown in FIG. 3B, table 301 may include, for example, a validation indicator column 340 which indicates whether a revision has been sufficiently tested for use by a client device; an approved indicator column 350 which indicates whether a revision has been approved for use (e.g., by a developer) by a client device; and a change log entry column 360 storing notes inputted by an operator regarding a revision. Software service management device 110 may determine software service metadata 112 included in table 301 based on inputs received from operators, and operators may direct software service management device 110 to change data stored in one or more entries in table 301.

Validation indicator column 340 may include entries indicating whether a revision has been sufficiently tested (shown in FIG. 3B as "Validated" or "Unvalidated"). For example, an operator may program a value for validation indicator column 340 to indicate whether a revision has been adequately tested and is determined to be free of defects. In certain implementations, software service management device 110 may automatically program the data in one or more entries of validation indicator column 340. For example, when a revision is first received, software service management device 110 may initially set an associated entry in validation indicator column 330 as "Unvalidated" (or "invalid") and this designation may be changed when an operator provides an input indicating that a revision has been sufficiently tested for certain ROLES and/or CONTEXTS. In the specific example shown in FIG. 3B, Revisions 1, 2, 3, and N−1 are designated as "Validated," and Revision N is designated as "Unvalidated."

In certain implementations, software service management device 110 may change the associated entry in validation indicator column 340 to indicate that the revision of the update is "validated" after receiving an instruction message from an operator. Additionally, software service management device 110 may automatically (e.g., without receiving a user instruction) change the associated entry in validation indicator column 340 in certain situations. For example, a revision may be automatically designated as "validated" a certain time period after the revision is received, if other revisions of the update are marked as "unvalidated" (e.g., when no other revisions are "validated"), etc. In another example, software service management device 110 may automatically invalidate a revision if at least one of services referenced from this revision is no longer valid so that only "healthy" configurations of service collections are discoverable by requesting device 130.

Change log entry column 360 may include data and/or notes received from an operator that is used to determine values in other portions of table 301. For example, change log entry column 360 may include entries indicating whether a revision of a service has approved by passing A/B testing or validated by passing an integration testing.

Although FIG. 3B shows exemplary entries in table 301, in other implementations, table 301 may include fewer entries, different entries, differently arranged entries, or additional entries than those depicted in FIG. 3B. Additionally or alternatively, one or more entries of table 301 may store data described as being stored by one or more other entries of table 301.

For example, although not shown in FIG. 3B, table 301 may further include information indicating whether a service revision is approved/validated for certain ROLES and/or CONTEXTS. For example, revisions (revisions for collection of services) may be marked with service metadata that identify additional "confidence" indicators regarding the "usability" of a revision. If a revision is considered "unusable" then a special indicator may be added. A client (e.g., requesting device 130) may express a requirement on "how good" the revision should be and discovery service in software service management device 110 may select between enabled (e.g., approved/validated) revisions matching the criteria. In this way, software service management device 110 may enforce dynamic resolution identifying possible service options for requesting device 130 and allowing requesting device 130 to express desired "usability" indicators. Furthermore, disabling a service revision may automatically disable all tag revisions referring to it, thus preventing requesting device 130 from using a "broken" configurations.

As previously described, a service tag represents states of an evolving collection of services. As shown in FIG. 3C, table 302 may describe evolution of service collection metadata over time. In table 302, entries in each row are immutable (e.g. can not be changed) and are associated with a particular revision of a service tag and describe particular state of collection of services. Each column presents different types of metadata associated with service tag revisions. Service collection definition is immutable and any change in the service collection result in creation of new service tag revision. Hence, in table 302, adjacent tag revisions typically differ in a single service. By addressing different rows in table 302, software service management device 110 may determine attributes of different configurations of services over time and may select different combinations to use by requesting device 130.

As shown in FIG. 3C, table 302 may include revision identifier column 310 identifying a service revision 142 associated with the service tag and revision time identifier column 320 associated with generation of the service tag (e.g., a time when a revision was generated since the service tag may be generated at roughly the same time to provide data regarding the revision). Furthermore, the data in revision identifier column 310 may be used in tag expansion process to identify revisions that are available/valid for use by requesting device for a given ROLE and CONTEXT. For example, revision identifier column 310 may identify a row number in table 300.

As shown in FIG. 3C, table 302 may also include a service collection data column 370. Service collection data column 370 may include values mapping service types (shown in FIG. 3C as "Inventory" and Artifacts") to particular service revisions. For example, revision 1 is shown in FIG. 3C as having "Inventory" service type being mapped to revision 1 of "inventory:dev" service, and "Artifact" service type to revision 1 of "artifact:dev" service. Inturn concrete service revisions map into concrete contact information for the service deployment to use. In this way, a service tag may identify specific service deployments to use when client is looking for a particular APIs (defined by ROLE, i.e. service type).

Although FIG. 3C shows table 302 as including certain types of metadata associated with service tags that may be stored by software service management device 110, it should be appreciated that table 302 may include different, additional, fewer, and/or differently order data than shown in FIG. 3C.

FIG. 3D shows a table 303 that may store mutable parts of entries describing service tag revisions. In table 303, entries in each row are associated with a same service tag, and each column presents different types of tag metadata associated with service tag revision. Tag metadata identified in table 303 is generally mutable (e.g., can be changed over time) to reflect changes in the statuses of the service tag revisions identified in revision identifier column 310. As shown in FIG. 3D, table 303 may include, for example, a validation indicator column 340 which indicates whether a revision has been sufficiently tested for use by a client device; an approved indicator column 350 which indicates whether a revision has been approved for use by a client device; and a change log entry column 360 storing notes inputted by an operator regarding a revision, such as whether a developer approved the revision and/or the revision has been validated by a test group of users (e.g., a beta group). Table 3 may further include an enabled indicator column 380 that provides an indication of whether a service tag identifies an associated revision as being enabled (e.g., to be identified to requesting device 130). Service management device 110 may determine software service metadata 112 included in table 303 based on inputs received from operators, and operators may direct software service management device 110 to change data stored in one or more entries in table 303.

Metadata attributes shown in FIG. 3D, table 303 may be used to select best revision to use by specific client. A client (e.g., requesting device 130) may express a requirement on "what" service tag should be used to define CONTEXT of the call and "how good" the tag revision should be. This is done by providing logical tag revision identifier, e.g. "client:prod@approved" or "mobile:qa@enabled". and discovery service in software service management device 110 may select between enabled (e.g., approved/validated) revisions matching the criteria. In this way, software service management device 110 may enforce dynamic resolution identifying possible service options for requesting device 130 and allowing requesting device 130 to express desired "usability" indicators.

Although FIG. 3D shows exemplary entries in table 303, in other implementations, table 303 may include fewer entries, different entries, differently arranged entries, or additional entries than those depicted in FIG. 3D. Additionally or alternatively, one or more entries of table 303 may store data described as being stored by one or more other entries of table 303.

Figure 4:
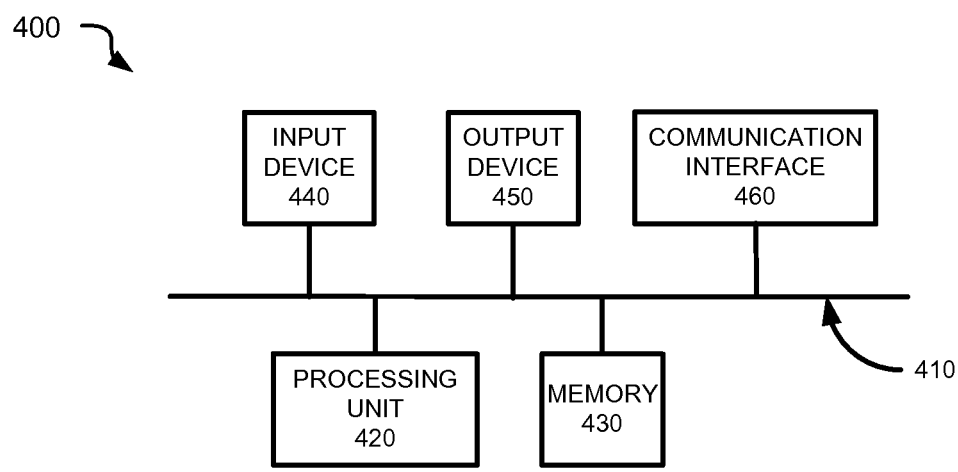
FIG. 4 is a diagram illustrating exemplary components of a computing device that may be included in the environment of FIGS. 1A and 1B.

FIG. 4 is a diagram illustrating exemplary functional components of a computing device 400 according to an implementation described herein. Software service management device 110, an element of network 120 (e.g., a node, router, blade, etc.), requesting device 130, and/or software service provisioning device 140 may include one or more computing devices 400. As shown in FIG. 4, device 400 may include a bus 410, a processing unit 420, a memory 430, an input device 440, an output device 450, and a communication interface 460.

Bus 410 may include a path that permits communication among the components of device 400. Processing unit 420 may include any type of single-core processor, multi-core processor, microprocessor, latch-based processor, and/or processing logic (or families of processors, microprocessors, and/or processing logics) that interprets and executes instructions. In other embodiments, processing unit 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processing unit 420, and/or any type of non-volatile storage device that may store information for use by processing unit 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into device 400. Input device 440 may include, for example, a keyboard, a mouse, a pen, a microphone, a remote control, an audio capture device, an image and/or video capture device, a touch-screen display, and/or another type of input device. In some embodiments, device 400 may be managed remotely and may not include input device 440. In other words, device 400 may be "headless" and may not include a keyboard, for example.

Output device 450 may output information to an operator of device 400. Output device 450 may include a display, a printer, a speaker, and/or another type of output device. For example, device 400 may include a display, which may include a liquid-crystal display (LCD) for displaying content to the customer. In some embodiments, device 400 may be managed remotely and may not include output device 450. In other words, device 400 may be "headless" and may not include a display, for example.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to radio frequency (RF) signals and/or a receiver that converts RF signals to baseband signals.

Communication interface 460 may include and/or may be coupled to an antenna for transmitting and receiving RF signals. For example, communication interface 460 may be coupled to an antenna assembly that includes one or more antennas to transmit and/or receive RF signals. The antenna assembly may, for example, receive data from communication interface 460 and transmit RF signals associated with the data, or the antenna assembly may receive RF signals and provide them to communication interface 460 to be processed.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth® wireless interface, a radio-frequency identification (RFID) interface, a near-field communications (NFC) wireless interface, and/or any other type of interface that converts data from one form to another form.

As will be described in detail below, device 400 may perform certain operations, and device 400 may perform these operations in response to processing unit 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processing unit 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than those depicted in FIG. 4. Additionally or alternatively, one or more components of device 400 may perform one or more tasks described as being performed by one or more other components of device 400.

Figure 5:
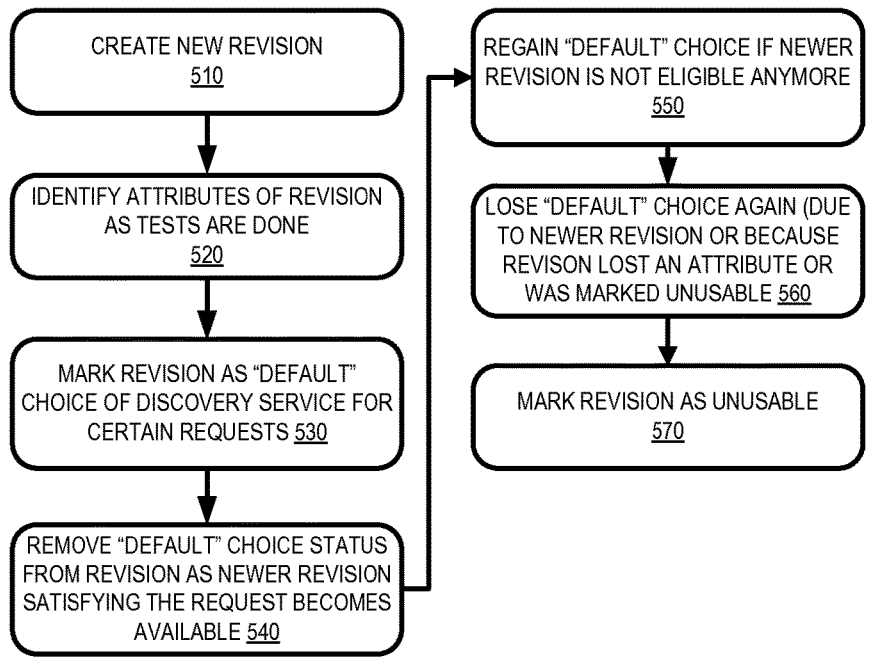
FIG. 5 is a flowchart of a process managing web service revisions in the environment of FIGS. 1A and 1B.

FIG. 5 is a flowchart of a process 500 for managing a web service revision 142. In some implementations, process 500 may be performed by software service provisioning device 140. In other implementations, some or all of process 500 may be performed by another device or a group of devices separate from and/or including software service provisioning device 140, such as software service management device 110.

As shown in FIG. 5, process 500 may include, for example, creating a new revision (block 510); adding more attributes by analyzing a revision and/or based on performing external tests are done (block 520). A revision may become a "default" choice of discovery service for certain requests, such as requests identifying a ROLE and a CONTEXT identified associated with the revision (block 530). The revision may lose "default" choice status as newer revision satisfying the query becomes available (block 540) but the revision may regain "default" choice status (e.g., roll-back) if, for example, the newer revision is marked as unusable or otherwise determined to be ineligible for access by requesting device 130 (block 550). The revision may again lose "default" choice status if, for example, a newer revision is received, the revision loses an important attribute, and/or is marked as unusable (block 560). The revision may be marked as unusable (block 570) when, for example, a service called by the revision is no longer available.

Figure 6:
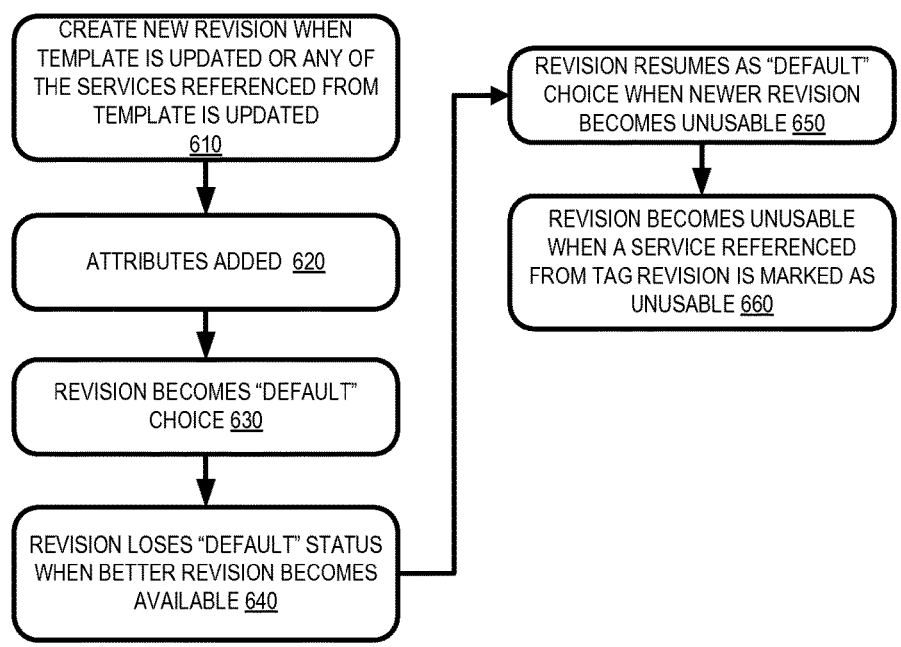
FIG. 6 is a flowchart of a process for selecting a revision of a web service in the environment of FIGS. 1A and 1B.

FIG. 6 is a flowchart of a process 600 for managing tag metadata related to a revision. In some implementations, process 600 may be performed by software service management device 110. In other implementations, some or all of process 600 may be performed by another device or a group of devices separate from and/or including software service management device 110, such as software service provisioning device 140.

For example, as shown in FIG. 6, process 600 may include creating a new revision when a template is updated and/or any of the services referenced from a template is updated (block 610). Attributes regarding a revision may be added (e.g., when the revision is validated based on testing) (block 620). The revision may become a "default" choice for certain ROLES/CONTEXT identified in a template when the attributes indicate that revision has been validated/approved (block 630). The revision may lose "default" status when a better (e.g., newer) revision that is meets the ROLE/CONTEXT becomes available (block 640). The revision may regain the "default" status on a rollback (e.g., when the newer version is determined not meet the ROLE/CONTEXT or determined to be unavailable (650). Eventually, the revision may become unusable because one of the services referenced from the tag revision is marked unusable (block 660).

As described herein, systems and methods may enable software service provisioning device 140 to store multiple web service revisions 142. Software service management device 110 may collect software service metadata 112 regarding the different web service revisions 142. Software service management device 110 may receive a query from requesting device 130 identifying an intended role/context for a service, and software service management device 110 may use software service metadata 112 to identify various web service revisions 142 that may be used by requesting device 130 to achieve the desired ROLE/CONTEXT. For example, software service provisioning device 140 may store multiple copies of a same revision 142, and software service management device 110 may select among the copies to manage traffic (e.g., to distribute web service requests among multiple ports software service provisioning device 140. In yet another example, if software service query 132 is received in connection with another web service, software service management device 110 may select web service revisions 142 that are compatible with the other web service.

In another example, software service management device 110 may cause different requesting devices 130 to use different web service revisions 142. For example, software service management device 110 may cause requesting devices 130 at a location to use a web service revision 142, and different requesting devices 130 at a different location to use a different web service revision 142. Using different web service revisions in this manner may help achieve load balancing among software service provisioning devices 142. Software service management device 110 may also compare results from use of the different web service revisions 142, and may identify a web service revision 142 associated with a fewest number of errors, best performance, best efficiency, etc., for use during a subsequent time period.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to processes 500 and 600 of FIGS. 5 and 6, the order of the blocks and/or signals in processes 500 and 600 may be modified in other implementations. Further, non-dependent blocks and/or signals in processes 500 and 600 may be performed in parallel.

For example, software service provisioning device 140 may determine to delete an oldest web service revision 142 when software service provisioning device 140 stores more than a threshold number of web service revisions 142. In another example, software service provisioning device 140 may determine to delete a web service revision 142 that has been designated as unusable and/or is associated with more than a threshold number or rate of errors when accessed by requesting device 130. In yet another example, software service provisioning device 140 may determine to delete a web service revision 142 that has not been accessed during a threshold time period.

In another example, software service management device 110 may further determine portions of software service metadata 112 based on feedback from requesting device 130, such as problems or failure feedback associated with accessing a web service. For example, software service management device 110 may include, in software service metadata 112, data identifying results from requesting device 130 accessing one or more web service revisions 142.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   determining, by a processor associated with a first device, attributes associated with revisions of a first service, wherein the first service uses a second service, and wherein a portion of the attributes associated with one of the revisions of the first service, includes:
      immutable data associated with the revision, wherein the immutable data identifies the revision, a time associated with generation of the revision, connection data associated with accessing the revision at a network location, and an associated one of a plurality of revisions of the second service used by the revision of the first service, and
      mutable data associated with the revision, wherein the mutable data indicates whether the revision of the first service is valid to be used with the associated revision of the second service and whether the revision of the first service is enabled to be discovered at the network location;
   receiving, by the processor and during a first time period, a query from a second device, wherein the query includes a logical name for the first service, wherein the logical name identifies a role and a context in which the second device will use the first service;
   determining, by the processor and based on the logical name, one of the revisions of the second service being used by the second device;
   identifying, by the processor and based on the attributes, two or more of the revisions that are enabled and valid to be used with the revision of the second service, wherein the two or more revisions includes a first revision associated with a most recent of the times associated with the two or more revisions;
   forwarding, by the processor and as first discovery data, a portion of the immutable data identifying the first revision and the connection data associated with the first revision to the second device; and
   deleting, by the processor, at least one revision of the two or more revisions when the at least one revision has not been accessed at the network location by any device for a threshold period of time.

2. The method of claim 1, further comprising:
   determining, during a second time period, a modification to the mutable data, wherein the modification indicates that the first revision is no longer enabled to be discovered, and wherein the second time period is after the first time period; and
   forwarding, to the second device and as second discovery data, another portion of the immutable data that identifies a second revision of the two or more revisions and connection data associated with the second revision, wherein the second discovery data omits data associated with the first revision.

3. The method of claim 2, wherein the modification further indicates that the first revision is no longer valid to be used with the revision of the second service.

4. The method of claim 2, wherein the first revision further uses a revision of a third service, and the modification indicates that first revision is no longer to be used with the revision of the third service.

5. The method of claim 2, further comprising:
   determining, during a third time period, another modification to the mutable data, wherein the other modification indicates that the first revision is enabled to be discovered during the third time period, and wherein the third time period is after the second time period; and
   forwarding, to the second device and as third discovery data, the portion of the immutable data that identifies the first revision and the connection data associated with the first revision.

6. The method of claim 1, further comprising:
   determining, during a second time period, a modification to the mutable data, wherein the modification indicates that a second revision is enabled to be discovered and valid to be used with the revision of the second service, wherein a time associated with the second revision is after the time associated with the first revision, and wherein the second time period is after the first time period; and
   forwarding, to the second device and as second discovery data, another portion of the immutable data that identifies the second revision of the two or more revisions and connection data associated with the second revision.

7. The method of claim 6, further comprising:
   determining, during a third time period, another modification to the mutable data, wherein the other modification indicates that the second revision is no longer enabled to be discovered during the third time period, and wherein the third time period is after the second time period; and forwarding, to the second device and as third discovery data, the portion of the immutable data that identifies the first revision and the connection data associated with the first revision.

8. A device comprising:
a memory configured to store instructions; and
a processor configured to execute the instructions to:
determine attributes associated with revisions of a first service, wherein the first service uses a second service, and wherein a portion of the attributes associated with one of the revisions of the first service, includes:
  immutable data associated with the revision, wherein the immutable data identifies the revision, a time associated with generation of the revision, connection data associated with accessing the revision at a network location, and an associated one of a plurality of revisions of the second service used by the revision of the first service, and
  mutable data associated with the revision, wherein the mutable data indicates whether the revision of the first service is valid to be used with the associated revision of the second service and whether the revision of the first service is enabled to be discovered at the network location;
receive, during a first time period, a query from another device, wherein the query includes a logical name for the first service, wherein the logical name identifies a role and a context in which the other device will use the first service;
determine, based on the logical name, a revision of the second service being used by the other device;
identify, based on the attributes, two or more of the revisions that are enabled and valid to be used with the revision of the second service, wherein the two or more revisions includes a first revision associated with a most recent of the times associated with the two or more revisions;
forward, as first discovery data, a portion of the immutable data identifying the first revision and the connection data associated with the first revision to the other device; and
delete at least one revision of the two or more revisions when the at least one revision has not been accessed at the network location by any device for a threshold period of time.

9. The device of claim 8, wherein the processor is further configured to:
determine, during a second time period, a modification to the mutable data, wherein the modification indicates that first revision is no longer valid to be used with the revision of the second service, and wherein the second time period is after the first time period; and
forward, to the other device and as second discovery data, another portion of the immutable data that identifies a second revision of the two or more revisions and connection data associated with the second revision, wherein the second discovery data omits data associated with the first revision.

10. The device of claim 9, wherein the first revision further uses a revision of a third service, and the modification indicates that the first revision is no longer to be used with the revision of the third service.

11. The device of claim 9, wherein the processor is further configured to:
determine, during a third time period, another modification to the mutable data, wherein the other modification indicates that the first revision is to be used with the revision of the second service during the third time period, and wherein the third time period is after the second time period; and
forward, to the other device and as third discovery data, the portion of the immutable data that identifies the first revision and the connection data associated with the first revision.

12. The device of claim 8, wherein the query further request information regarding a third service, and wherein the processor is further configured to:
determine attributes associated with revisions of the third service;
identify one of the revisions of the third service that is usable with the first revision of the first service and the revision of the second service; and
include, in the first discovery data, connection information data with the identified revision of the third service.

13. The device of claim 8, wherein the processor is further configured to:
determine, during a second time period, a modification to the mutable data, wherein the modification indicates that a second revision is enabled to be discovered and valid to be used with the revision of the second service, wherein a time associated with the second revision is after the time associated with the first revision, and wherein the second time period is after the first time period; and
forward, to the other device and as second discovery data, another portion of the immutable data that identifies the second revision of the two or more revisions and connection data associated with the second revision.

14. The device of claim 13, wherein the processor is further configured to:
determine, during a third time period, another modification to the mutable data, wherein the other modification indicates that the second revision is no longer enabled to be discovered during the third time period, and wherein the third time period is after the second time period; and
forward, to the other device and as third discovery data, the portion of the immutable data that identifies the first revision and the connection data associated with the first revision.

15. The device of claim 8, wherein processor is further configured to:
determine that a threshold number of errors is exceeded when the other device uses the first discovery data to access the first revision at the network location;
modify, based on determining that the threshold number of errors is exceeded, the mutable data to indicate that the first revision is no longer enabled to be discovered at the network location; and
forward, to the other device and as second discovery data, another portion of the immutable data that identifies a second revision of the two or more revisions and connection data associated with the second revision, wherein the second discovery data omits data that enables the other device to access the first revision at the network location.

16. A non-transitory computer-readable medium to store instructions, wherein the instructions comprise:
instructions that, when executed by a processor associated with a device, cause the processor to:
determine attributes associated with revisions of a first service, wherein the first service uses a second service, and wherein a portion of the attributes associated with one of the revisions of the first service, includes:

immutable data associated with the revision, wherein the immutable data identifies the revision, a time associated with generation of the revision, connection data associated with accessing the revision at a network location, and an associated one of a plurality of revisions of the second service used by the revision of the first service, and mutable data associated with the revision, wherein the mutable data indicates whether the revision of the first service is valid to be used with the associated revision of the second service and whether the revision of the first service is enabled to be discovered at the network location;

receive, during a first time period, a query from another device, wherein the query includes a logical name for the first service, wherein the logical name identifies a role and a context in which the other device will use the first service;

determine, based on the logical name, a revision of the second service being used by the other device;

identify, based on the attributes, two or more of the revisions that are enabled and valid to be used with the revision of the second service, wherein the two or more revisions includes a first revision associated with a most recent of the times associated with the two or more revisions;

forward period, as first discovery data, a portion of the immutable data identifying the first revision and the connection data associated with the first revision to the other device; and delete at least one revision of the two or more revisions when the at least one revision has not been accessed at the network location by any device for a threshold period of time.

17. The non-transitory computer readable medium of claim 16, wherein the instructions further cause the processor to:

determine, during a second time period, a modification to the mutable data, wherein the modification indicates that the first revision is no longer enabled to be discovered, and wherein the second time period is after the first time period; and forward, to the other device and as second discovery data, another portion of the immutable data that identifies a second revision of the two or more revisions and connection data associated with the second revision, wherein the second discovery data omits data associated with the first revision.

18. The non-transitory computer readable medium of claim 17, wherein the instructions further cause the processor to:

determine, during a third time period, another modification to the mutable data, wherein the other modification indicates that the first revision is enabled to be discovered during the third time period, and wherein the third time period is after the second time period; and forward, to the other device and as third discovery data, the portion of the immutable data that identifies the first revision and the connection data associated with the first revision.

19. The non-transitory computer readable medium of claim 16, wherein the instructions further cause the processor to:

determine, during a second time period, a modification to the mutable data, wherein the modification indicates that a second revision is enabled to be discovered and valid to be used with the revision of the second service, wherein a time associated with the second revision is after the time associated with the first revision, and wherein the second time period is after the first time period; and forward, to the other device and as second discovery data, another portion of the immutable data that identifies the second revision of the two or more revisions and connection data associated with the second revision.

20. The non-transitory computer readable medium of claim 19, wherein the instructions further cause the processor to:

determine, during a third time period, another modification to the mutable data, wherein the other modification indicates that the second revision is no longer enabled to be discovered during the third time period, and wherein the third time period is after the second time period; and forward, to the other device and as third discovery data, the portion of the immutable data that identifies the first revision and the connection data associated with the first revision.

\* \* \* \* \*